(12) United States Patent
Le-Khac et al.

(10) Patent No.: US 9,133,297 B2
(45) Date of Patent: Sep. 15, 2015

(54) ULTRAVIOLET-CURABLE POLYOLS AND POLYURETHANE COMPOSITIONS MADE THEREFROM

(75) Inventors: Bi Le-Khac, West Chester, PA (US); Karl W. Haider, Wexford, PA (US); Ramesh Subramanian, Coraopolis, PA (US); Charles A. Gambino, McDonald, PA (US); James Edward Kassner, Wexford, PA (US); Hu Xiaowei, Exton, PA (US); William J. Sim, Simi Valley, CA (US)

(73) Assignee: ALLNEX IP S.à.r.L., Luxembourg (LU)

( * ) Notice: Subject to any disclaimer, the term of this patent is extended or adjusted under 35 U.S.C. 154(b) by 2300 days.

(21) Appl. No.: 11/434,286

(22) Filed: May 15, 2006

(65) Prior Publication Data

US 2007/0265367 A1 Nov. 15, 2007

Related U.S. Application Data

(63) Continuation of application No. PCT/US2004/038422, filed on Nov. 15, 2004, which is a continuation of application No. 10/976,684, filed on Oct. 29, 2004, now Pat. No. 7,041,708, which is a continuation-in-part of application No. 10/714,720, filed on Nov. 17, 2003, now abandoned.

(51) Int. Cl.

| C08G 18/79 | (2006.01) |
|---|---|
| C08G 18/81 | (2006.01) |
| C08G 18/42 | (2006.01) |
| C08G 18/68 | (2006.01) |
| C08G 18/08 | (2006.01) |
| C09D 175/16 | (2006.01) |
| C08F 2/48 | (2006.01) |
| C08G 18/66 | (2006.01) |

(52) U.S. Cl.
CPC ........ *C08G 18/0823* (2013.01); *C08G 18/4252* (2013.01); *C08G 18/6625* (2013.01); *C08G 18/68* (2013.01); *C08G 18/792* (2013.01); *C08G 18/8175* (2013.01); *C09D 175/16* (2013.01)

(58) Field of Classification Search
CPC ............. C08G 18/792; C08G 18/0823; C08G 18/8175; C08G 18/4252; C08G 18/68; C09D 175/16; C08F 2/48

USPC ............... 522/96, 6, 90, 92–93, 97, 150–154, 522/104, 173–175, 181; 525/43–46
See application file for complete search history.

(56) References Cited

U.S. PATENT DOCUMENTS

| 4,463,156 | A | 7/1984 | McGary, Jr. et al. | 528/65 |
|---|---|---|---|---|
| 4,876,384 | A | 10/1989 | Higbie et al. | 560/224 |
| 5,014,361 | A | 5/1991 | Gray | 2/167 |
| 5,610,205 | A | 3/1997 | Yang et al. | 522/102 |
| H1712 | H | 2/1998 | Papalos et al. | 560/224 |
| 6,017,997 | A | 1/2000 | Snow et al. | 524/591 |
| 6,806,348 | B2 * | 10/2004 | Hinz et al. | 528/480 |
| 6,855,844 | B1 * | 2/2005 | Geiger et al. | 560/76 |

FOREIGN PATENT DOCUMENTS

| DE | 102 09 449 S1 | 9/2003 |
|---|---|---|
| GB | 1 432 230 | 4/1976 |

OTHER PUBLICATIONS

Machine English translation of DE 10209449; Sep. 18, 2003.*
Block and Graft Polymerization, vol. 2, Ceresa Ed., John Wiley & Sons, (month unavailable) 1976, pp. 17-21, "The Synthesis and Properties of Block Copolymer Polyol Surfactants".
Analytical Chemistry, vol. 52, No. 8, (Jul. 1980) pp. 1374-1376, Stephen L. Wellons, Mark A. Carey and Decker K. Elder, "Determination of Hydroxyl Content of Polyurethane Polyols and Other Alcohols".

* cited by examiner

*Primary Examiner* — Mark Eashoo
*Assistant Examiner* — Jessica Roswell
(74) *Attorney, Agent, or Firm* — Drinker Biddle & Reath LLP

(57) ABSTRACT

Provided are ultraviolet (UV)-curable polyols and polyurethane compositions made by reacting the inventive polyol with an isocyanate. The inventive ultraviolet (UV)-curable polyol is made by co-polymerizing an alkylene oxide, an unsaturated carboxylic acid or anhydride and a hydroxy functional compound in the presence of a double metal cyanide (DMC) complex catalyst such that the polyol has an ultra-low level of unsaturation. The inventive polyols may be used to produce prepolymers, which in turn may be useful in making thin films which in turn may provide such items as medical examination gloves and scientific gloves. The inventive ultraviolet (UV)-curable polyurethane compositions may also find use in or as coatings, adhesives, sealants, elastomers and the like.

7 Claims, No Drawings

ULTRAVIOLET-CURABLE POLYOLS AND POLYURETHANE COMPOSITIONS MADE THEREFROM

CROSS REFERENCE AND RELATED APPLICATIONS

This Application is a continuation of PCT/US2004/038422, filed Nov. 15, 2004 (Pending), which is a Continuation of application Ser. No. 10/976,684 filed Oct. 29, 2004 (now U.S. Pat. No. 7,041,708, issued May 9, 2006), which is a Continuation-in-Part of application Ser. No. 10/714,720, filed Nov. 17, 2003 (now abandoned).

FIELD OF THE INVENTION

The present invention relates in general to polyols and compositions made therefrom, and more specifically, to ultraviolet (UV)-curable polyols and polyurethane compositions made by combining an isocyanate with the inventive ultraviolet (UV)-curable polyol. The ultraviolet (UV)-curable polyol is made by co-polymerizing an unsaturated carboxylic acid or anhydride, an alkylene oxide and a hydroxy functional compound in the presence of a double metal cyanide (DMC) complex catalyst such that the ultraviolet (UV)-curable polyol has an ultra-low level of unsaturation. The present invention also relates to coatings, adhesives, sealants, elastomers and the like which are made from the inventive polyurethane compositions.

BACKGROUND OF THE INVENTION

Natural rubber latex (NRL) is the material of choice in many applications requiring soft, thin-walled elastic articles, such as medical examination and scientific gloves. NRL articles typically are made by dipping a mandrel, pre-coated with a coagulant, into an aqueous rubber emulsion. To produce NRL gloves which are adequately strong, but which do not have pinholes, the dipped NRL gloves must be about 0.18 to about 0.20 mm thick. Although gloves made from NRL possess an excellent combination of flexibility, high elongation at break, tensile strength and a low degree of creep, in recent years the use of NRL has been under attack because of increased instances of allergic reactions caused by proteins and vulcanization accelerator residues present in NRL.

The manufacture of medical exam and scientific gloves from polyurethane is known to those skilled in the art. For example, U.S. Pat. No. 4,463,156, issued to McGary, Jr., et al., discloses a soft, low modulus, non-crystalline segmented polyurethane with a 100% modulus less than about 250 psi, initial tensile set less than about 30% and tensile strength of about 3500 to 6500 psi. McGary, Jr. et al. teach balancing the percent hard segment and the degree of cross-linking within the ranges of 14 to 25% hard segment and 5,000 to 30,000 molecular weight per cross-link in a segmented polyurethane. The polyurethane of the 156 patent is said to produce a flexible glove for use by surgeons and others which is easily donned and comfortable on the hand.

A waterborne dispersion of a polyurethane polymer said to be useful as a film having improved mechanical properties is disclosed by Snow, et al. in U.S. Pat. No. 6,017,997. The film is said to have properties comparable to rubber including, a percentage elongation greater than 700%, a tensile strength greater than 3,500 psi, a 100% modulus below 450 psi, a 300% modulus below 700 psi, and a 500% modulus below 1,500 psi. This film can be prepared in the absence of a solvent, thus making it attractive for a variety of protection products for medical and industrial applications such as gloves, condoms, catheters, and the like. However, the films of Snow et al. are crosslinked by the urethane reaction; therefore, the residual NCO may cause allergic reactions on human skin.

Papalos et al., in U.S. Statutory Invention Registration No. H 1,712, disclose radiation-curable compositions containing monoalkyl or mono-aralkyl ether di-acrylates or di-methacrylates of particular ethoxylated and/or propoxylated polyols. These polyol derivatives substituted with hydrophobic ether functionalities are said to constitute UV-curable diluents that can be isolated in excellent yields with minimal losses during the manufacturing process. The UV-curable diluents of Papalos et al. are said to be useful in radiation-curable compositions.

U.S. Pat. No. 4,876,384 issued to Higbie et al., teaches reactive diluents for radiation curable compositions. The diluents are lower alkyl ether acrylates and methacrylates of particular alkoxylated and non-alkoxylated polyols. Examples are mono-methoxy trimethylolpropane diacrylate, mono-methoxy neopentyl glycol monoacrylate and mono-methoxy, ethoxylated neopentyl glycol monoacrylate having an average of about two moles of ethylene oxide.

No mention is made in either of these disclosures of making a coating, adhesive, sealant or elastomer from the reactive diluent by combining it with an isocyanate to form a polyurethane.

Polyurethane is typically made by reacting a polyol with an isocyanate. The majority of polyoxyalkylene polyether polyols are polymerized through base catalysis. For example, polyoxypropylene diols are prepared by the base-catalyzed oxypropylation of a difunctional initiator such as propylene glycol. During base-catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17-21. Unsaturation is measured in accordance with ASTM D-2849-69 "Testing Urethane Foam Polyol Raw Materials," and expressed as milliequivalents of unsaturation per gram of polyol (meq/g). Due to this continual creation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4,000 Dalton (Da) molecular weight, the content of monofunctional species may be between 30 and 40 mole percent. In such cases, the average functionality is lowered to 1.6 to 1.7 from the nominal, or theoretical functionality of 2.0. In addition, base-catalyzed polyols have a high polydispersity ($M_w/M_n$) due to the presence of the substantial, low molecular weight fractions.

Lowering unsaturation and the attendant high monol fraction in polyoxypropylene polyols has been touted as a means of providing polyurethane compositions with improved properties. Often, formulations must be chosen to balance conflicting properties. For example, increases in tensile strength are often accompanied by a decrease in elongation.

Therefore, a need exists in the art for a polyol that will provide prepolymers that can be used to make thin films having the desired properties of natural rubber latex (NRL) including low modulus, high elongation, high tensile strength and solvent resistance, without the drawbacks associated with NRL such as allergic reactions. Further, it would be desirable if the polyol could provide UV-curable polyurethane compositions having a low modulus, high elongation, high tensile strength and solvent resistance that are suitable for use in or as coatings, adhesives, sealants, elastomers and the like.

SUMMARY OF THE INVENTION

Accordingly, the present invention alleviates the need in the art by providing an ultraviolet (UV)-curable polyol made by co-polymerizing an alkylene oxide, an unsaturated carboxylic acid or anhydride and a hydroxy functional compound in the presence of a double metal cyanide (DMC) complex catalyst. The inventive ultraviolet (UV)-curable polyols can be combined with an isocyanate and at least one of a photo-initiator and a cross-linking agent to produce prepolymers for making thin films having the desired properties of natural rubber latex (NRL) including low modulus, high elongation, high tensile strength and solvent resistance, without the drawbacks associated with NRL such as allergic reactions. An ultraviolet (UV) cure substantially improves isopropanol (IPA) resistance of those gloves or films including the inventive ultraviolet (UV)-curable polyols without adversely affecting the tensile properties.

Further, the present invention provides ultraviolet (UV)-curable polyurethane composition made from an isocyanate and an ultraviolet (UV)-curable polyol that is made by co-polymerizing an alkylene oxide, an unsaturated carboxylic acid or anhydride and a hydroxy functional compound and which has an ultra-low level of unsaturation. The ultraviolet UV-curable polyurethane compositions of the present invention may be used in or as coatings, adhesives, sealants, elastomers and the like.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

The term "NCO content" herein refers to the isocyanate group content of the prepolymer, before chain extension. The term "molecular weight" means number average molecular weight unless indicated otherwise. The number average molecular weights for the polyether glycols are each determined from the hydroxyl number of the polyether glycol as measured by the imidazole-pyridine catalyst method described by S. L. Welton et al., "Determination of Hydroxyl Content of Polyurethane Polyols and Other Alcohols", ANALYTICAL CHEMISTRY, Vol. 52, No. 8, pp. 1374-1376 (July 1980). The molecular weights and equivalent weights given herein in Da (Daltons) are number average molecular weights and number average equivalent weights, respectively, unless specified otherwise.

The present invention provides an ultraviolet (UV)-curable polyol comprising the reaction product of 30 to 70 wt. % of a hydroxy functional compound having a functionality of 2 to 3, 1 to 10 wt. % of an unsaturated carboxylic acid or anhydride and 20 to 69 wt. % of an alkylene oxide, wherein the reaction occurs in the presence of a double metal cyanide (DMC) catalyst.

The present invention also provides an ultraviolet (UV)-curable polyurethane composition made from at least one isocyanate and at least one ultraviolet (UV)-curable polyol comprising the reaction product of 30 to 70 wt. % of a hydroxy functional compound having a functionality of 2 to 3, 1 to 10 wt. % of an unsaturated carboxylic acid or anhydride and 20 to 69 wt. % of an alkylene oxide, wherein the at least one ultraviolet (UV)-curable polyol has an unsaturation of less than 0.01 meq/g.

The present invention further provides a process of making an ultraviolet (UV)-curable polyurethane composition involving reacting at least one isocyanate with at least one ultraviolet (UV)-curable polyol comprising the reaction product of 30 wt. % to 70 wt. % of a hydroxy functional compound having a functionality of 2 to 3, 1 wt. % to 10 wt. % of an unsaturated carboxylic acid or anhydride and 20 wt. % to 69 wt. % of an alkylene oxide, such that the sum of the percentages totals 100, wherein the at least one ultraviolet (UV)-curable polyol has an unsaturation of less than 0.01 meq/g and curing the ultraviolet (UV)-curable polyurethane composition.

The present invention yet further provides a coated substrate comprising a substrate having applied thereto an ultraviolet (UV)-curable polyurethane composition comprising at least one isocyanate and at least one ultraviolet (UV)-curable polyol comprising a reaction product of 30 wt. % to 70 wt. % of a hydroxy functional compound having a functionality of 2 to 3, 1 wt. % to 10 wt. % of an unsaturated carboxylic acid or anhydride and 20 wt. % to 69 wt. % of an alkylene oxide, such that the sum of the percentages totals 100, wherein the at least one ultraviolet (UV)-curable polyol has an unsaturation of less than 0.01 meq/g.

The co-polymers of alkylene oxide and unsaturated carboxylic acids or anhydrides whether or not included in the ultraviolet (UV)-curable polyurethane compositions of the present invention are photo-curable. The inventors have found, surprisingly, that unsaturated carboxylic acids and anhydrides such as cis-1,2,3,6-tetrahydrophthalic anhydride can co-polymerize well with alkylene oxides such as propylene oxide (PO) in the presence of a double metal cyanide (DMC) catalyst. This conversion is complete even at low concentrations of monomer.

The hydroxy functional compound may be polypropylene oxide, polyethylene oxide, polybutylene oxide, copolymers of propylene oxide and ethylene oxide, copolymers of propylene oxide and butylene oxide, copolymers of butylene oxide and ethylene oxide, and mixtures thereof. Preferred as the hydroxy functional compound is polyoxypropylene. The hydroxy functional compound is preferably used in amounts of 30 to 70 wt. %, more preferably 30 to 60 wt. % and most preferably 40 to 60 wt. %. The functionality of the hydroxy functional compound is from 2 to 3.

The unsaturated carboxylic acid or anhydride may be any compounds bearing at least one C=C group and at least one carboxylic acid or anhydride group. Examples include cis-1,2,3,6-tetrahydrophthalic acid and anhydride and maleic acid and anhydride. Preferred as the unsaturated carboxylic acid or anhydride is cis-1,2,3,6-tetrahydrophthalic anhydride. The unsaturated carboxylic acid or anhydride may be used in amounts of 1 to 10 wt. %, more preferably 1 to 5 wt. % and most preferably 2 to 5 wt. %.

The alkylene oxide may be propylene oxide, ethylene oxide, butylene oxide, the like, and mixtures thereof. Preferably, the alkylene oxide is propylene oxide. The alkylene oxide may be used in amounts of 20 to 60 wt. %, more preferably 20 to 50 wt. % and most preferably 25 to 50 wt. %.

Recent advances in DMC catalysts and polyoxyalkylation processes have enabled the practical preparation of ultra-low unsaturation polyoxypropylene polyols. High molecular weight polyols, for example those in the 4,000 Da to 8,000 Da molecular weight range, typically exhibit unsaturation in the range of 0.004 to 0.007 meq/g if catalyzed by these DMC catalysts. At those levels of unsaturation, the amount of monofunctional species is only 2 mole percent or less. Moreover, gel permeation chromatography (GPC) analysis shows those polyols to be virtually monodisperse, often exhibiting polydispersities less than 1.10. A number of such polyols have been commercialized, by the assignee of the present disclosure, as ACCLAIM polyols. These ultra-low unsaturation polyols have been found to be quantitatively different than both conventional polyols and low unsaturation polyols.

Therefore, the catalyst used to produce the ultraviolet (UV)-curable polyol of the present invention is preferably a double metal cyanide (DMC) catalyst, such as those disclosed in U.S. Pat. Nos. 5,470,813 and 5,482,908, the entire contents of which are incorporated herein by reference. Through the use of the catalysts disclosed in those references, unsaturation levels in the range of 0.004 to 0.008 may be achieved.

Following preparation, the inventive ultraviolet (UV)-curable polyol may be reacted directly with an isocyanate to produce a polyurethane, or via a prepolymer process the polyol may be reacted with an excess of the desired diisocyanate, preferably under a nitrogen atmosphere at slightly elevated temperature, i.e., from 50° C. to 100° C. more preferably from 60° C. to 90° C. The reaction of the isocyanate with the ultraviolet (UV)-curable polyol of the present invention may be catalyzed, but it is generally preferred that the reaction take place without catalysis. To make a prepolymer, the reaction proceeds until the point where the isocyanate content becomes constant. The isocyanate-terminated prepolymers of the present invention preferably have an NCO group content of from 0.1 to 10 wt. %, more preferably from 0.5 to 5 wt. % and most preferably from 1 to 2 wt. %.

Both aliphatic and aromatic di- and polyisocyanates may be used to prepare the prepolymers and ultraviolet (UV)-curable polyurethane compositions of the present invention. Diisocyanates are preferred; however it is within the scope of the invention to include a minor amount, i.e., not more than approximately 20 mole percent, of a tri- or higher-functionality isocyanate. Preferred isocyanates include, but are not limited to, linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 2,4' and 4,4'-methylene diphenylene diisocyanate (2,4'- and 4,4'-MDI, respectively), tetramethylxylylene diisocyanate, and the like. Less preferred aromatic diisocyanates include the polymethylene polyphenylene polyisocyanates having functionalities greater than two. Also preferred are modified diisocyanates prepared by reacting one or more diisocyanates with themselves, or with a low molecular weight isocyanate reactive compound to form urea-modified, urethane-modified, carbodiimide-modified, allophanate-modified, uretonimine-modified, biuret-modified, and other modified isocyanates, many of which are commercially available. More than one isocyanate may be used. Particularly preferred is 2',4-toluene diisocyanate (2',4-TDI).

The polyurethane compositions of the present invention can include one or more photoinitiators. Suitable photoinitiators include, for example, aromatic ketone compounds, such as benzophenones, alkylbenzophenones, Michler's ketone, anthrone and halogenated benzophenones. Further suitable compounds include, for example, 2,4,6-trimethylbenzoyl-diphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene 9,10-dichloroanthracene; 4,4-dichlorobenzophenone; thioxanthone; isopropyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; maleimides and their derivatives; and mixtures thereof. There are a number of suitable photoinitiators commercially available from Ciba including IRGACURE 184 (1-hydroxy-cyclohexyl-phenyl-ketone), IRGACURE 819 phenyl (bis(2,4,6-trimethylbenzoyl)-phenylphosphineoxide), IRGACURE 1850 (a 50/50 mixture of bis(2,6-dimethoxybenzoyl)-2,4,4-trimethylpentyl-phosphine oxide and 1-hydroxy-cyclohexyl-phenyl-ketone), IRGACURE 1700 (a 25/75 mixture of bis(2,6-dimethoxybenzoyl)-2,4,4-trimethylpentyl-phosphine oxide and 2-hydroxy-2-methyl-1-phenyl-propan-1-one), IRGACURE 907 (2-methyl-1-[4-(methylthio)phenyl]-2-morpholonopropan-1-one), DAROCUR MBF (a pheny glyoxylic acid methyl ester), IRGACURE 2020 Photoinitiator Blend (20% by weight of phenyl bis (2,4,6-trimethyl benzoyl) phosphine oxide (IRG819) and 80% by weight of 2-Hydroxy-2-methyl-1-phenyl-1-propanone (DAROCUR 1173)) and DAROCUR 4265 (a 50/50 mixture of bis(2,4,6-trimethylbenzoyl)-phenylphosphineoxide and 2-hydroxy-2-methyl-1-phenyl-propan-1-one). The foregoing list is meant to be illustrative only and is not meant to exclude any suitable photoinitiators. As those skilled in the art are aware, the concentrations at which photoinitiators are effectively employed is not particularly critical, but may be 0.3 to 10 wt. %, and more preferably, from 1 to 5 wt. % of the final product.

Those skilled in the art of photochemistry are fully aware that photoactivators can be used in combination with the aforementioned photoinitiators and that synergistic effects are sometimes achieved when such combinations are used. Photoactivators are so well known in the art that no further description is required to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

Curing may also take place in the presence of compounds that generate free radicals such as (hydro)peroxides optionally in the presence of accelerators. and cationically in the presence of superacids like the phenyl sulfonium metal salts.

The inventive prepolymers can be used to produce thin films which may be fashioned into medical exam and scientific gloves by methods known to those skilled in the art. Thin films prepared from a water dispersion of the diol-based prepolymer of the present invention show a significant improvement in isopropanol (IPA) resistance. One of the advantages of ultraviolet (UV) cure, as shown in the instant disclosure, was that this IPA resistance improved without any significant degradation in the physical properties of the film (tensile, modulus).

The ultraviolet (UV)-curable polyurethane compositions of the present invention may preferably be used in the preparation of coatings, adhesives, sealants, elastomers and the like. Depending upon the particular application, the inventive ultraviolet (UV)-curable polyurethane compositions may also contain additives commonly used in the art including, but not limited to, dispersing agents, flow aid agents, thickening agents, defoaming agents, deaerating agents, pigments, fillers, flattening agents and wetting agents. In addition, where the article to be coated is of such a shape that portions of the coating may not be exposed to radiation, it is possible to add materials which crosslink through carboxyl, hydroxyl, amino groups or moisture. Such materials include carbodiimides, aziridines, polyvalent cations, melamine/formaldehyde, epoxies, and isocyanates. Suitable carbodiimides are known and described, e.g., in U.S. Pat. Nos. 5,104,928, 5,574,083, 5,936,043, 6,194,522, 6,300,409 and 6,566,437. Where used, such crosslinkers should be in an amount of from 0.1 to 35% by weight based on the combined weight of the isocyanate and UV-curable polyol.

To make one of a coating, adhesive, sealant, elastomer and the like, the isocyanate and ultraviolet (UV)-curable polyol may be first mixed together and then any other additives added thereto. The inventive ultraviolet (UV)-curable polyurethane compositions may be applied onto various substrates by any method known to those skilled in the art, including, but not limited to, spraying, rolling, knife-coating, pouring, brushing, dipping, putty knife or squeegee.

The compositions of the present invention are highly compatible with both porous and nonporous substrates. The compatibility with nonporous materials allows these compositions to be applied onto a wide range of nonporous polymers, including polybutylene terephthalate, polyethylene terephthalate, other polyester, polyolefin, polymethyl (meth)acrylate, vinyl acetate, ABS, polyvinyl, polystyrene, high impact polystyrene, polycarbonate, polyurethane, epoxy, polyimide, polyamide, polyamideimide, polyacrylate, polyacrylamide, combinations of these, and the like. Because radiation curing generates little heat, the compositions of the present invention may also be used on heat sensitive substrates. The compositions of the present invention may also be applied to metal, glass and ceramic.

The inventive ultraviolet (UV)-curable polyurethane compositions are curable using radiation sources having wavelengths of at least 300 nm and preferably from 320 to 450 nm. The distance between the surface and the radiation source will depend on spectral overlap of lamp emission spectrum and photoinitiator absorption spectrum and on the intensity of the lamp. The length of time the coated substrate is subjected to the radiation will depend on the spectral overlap of lamp emission spectrum and photoinitiator absorption spectrum, the distance form the radiation sources, and the lamp intensity, solvent content in the formulation, temperature and humidity of the cure surroundings but will generally be less than 10 minutes and may be as short as 0.1 seconds.

This radiation can be provided by any suitable source such as UV lamps with reduced infrared emission or UV lamps fitted with filters to eliminate infrared emissions or so-called LEDs (light-emitting devices) emitting radiation in the wavelength range noted. Particularly useful commercially available devices are available from Panacol-Elosol GmbH: (PANACOL UV H-254 and PANACOL UVF-450 lamps); from Honle UV America Inc. (HONLE UVA HAND 250 CUL); from Pro Motor Car Products Inc. (PMP 250 watt metal halide lamp); from H&S Autoshot (CURE-TEK UVA-400); from UV Process Supply Inc. (CON-TROL-CURE SCARAB-250 UV-A shop lamp system, CON-TROL-CURE-UV LED CURE-ALL 415, CON-TROL-CURE-UV LED CURE-ALL 390); from UV Light Technologies (UV H253 UV lamp); from Phoseon Technology (RADION RX10 module curing using solid state high intensity UV light source); from Quantum Technologies (Low intensity microwave UV System Model QUANT-18/36); from Inretech Technologies (WORKLED); from Inretechn Technologies (Flashlight MC with 20×LED adapter); and Phillips (TL03 lamp with radiation output above 380 nm).

The present invention is further illustrated, but is not to be limited, by the following examples. All quantities given in "parts" and "percents" are understood to be by weight, unless otherwise indicated.

EXAMPLES

Polyol A

A 4,000 MW copolymer of propylene oxide and cis-1,2,3,6-tetrahydrophthalic anhydride using a monomer mixture of 3.9 wt. % of tetrahydrophthalic anhydride in propylene oxide was prepared by charging a 1.5-liter reactor with a 450 MW polyoxypropylene diol (105 g) starter and DMC catalyst prepared essentially by the method of U.S. Pat. No. 5,482,908 (0.0504 g, 50 ppm based on the amount of finished polyol product). The mixture was stirred and heated to 130° C., and was stripped under vacuum for 30 minutes to remove traces of water from the diol starter. After stripping, a mixture of propylene oxide and cis-1,2,3,6-tetrahydrophthalic anhydride (3.9 wt. % of tetrahydrophthalic anhydride) (15 g) was fed to the reactor, initially under a vacuum of about 30 in. Hg, and the reactor pressure was monitored. Additional monomer mixture was not added until an accelerated pressure drop occurred in the reactor. The pressure drop is indicative of catalyst activation. After catalyst activation was verified, the remaining mixture of propylene oxide and cis-1,2,3,6-tetrahydrophthalic anhydride (860 g) was added gradually over about four hours. After monomers addition was completed, the reactor mixture was held at 130° C. until a constant pressure was observed. Residual unreacted monomers were stripped under vacuum at 80° C. for 30 minutes from the polyol product.

The hydroxyl number and viscosity of the product were measured by standard methods and were 30 mg KOH/g and 1003 cps, respectively.

Polyol B

The procedure above was followed to produce a 4,000 MW copolymer of propylene oxide and cis-1,2,3,6-tetrahydrophthalic anhydride using a monomer mixture of 1.9 wt. % of tetrahydrophthalic anhydride in propylene oxide, by using a monomer mixture of 1.9 wt. % of tetrahydrophthalic anhydride in propylene oxide. The hydroxyl number and viscosity of the product were 28.4 mg KOH/g and 1163 cps, respectively.

The process for making a glove from the polyols described above involved five discrete steps:

(1) making a prepolymer;
(2) neutralizing the prepolymer;
(3) chain extension;
(4) dispersing the prepolymer in water; and
(5) glove dipping.

The first two steps are detailed below:

Prepolymer & Neutralization

The prepolymer reaction and neutralization steps were conducted in a standard, unbaffled round-bottom flask, containing a single "half-moon" shaped TEFLON agitator. The reactor was heated via electric heating mantle and temperature control is generally within ±1° C.

Prior to the experiment, the reactor was charged with the polyol (508.5 g of diol (Polyol A or B), 4.0 g of LHT-240 (a 700 molecular weight polyoxypropylene polyol available from Bayer Polymers LLC), 70 g of n-methyl pyrrolidinone (NMP), and 24 g of dimethylolpropionic acid (DMPA). This mixture was heated to 100° C. to dissolve the DMPA and evacuated to 50 mm Hg to reduce the water level to about 100-150 PPM. A Karl Fisher water analysis was conducted at the end of the strip to confirm the final water concentration. Nitrogen sparging was used both to control the vacuum at about 50 mm Hg and help strip out the water. When the water level reached the desired level, the reactor was cooled to about 60° C. 2',4-toluene diisocyanate (2',4-TDI) (93.5 g), available from Bayer Polymers LLC as MONDUR TDS, and trimethylol propane triacrylate (10.0 g) were added to the polyol. Addition of the TDI resulted in about a 15-20° C. exotherm, after which the reactor temperature was set to the desired run temperature of 80° C. The reactor was maintained at 80° C. and atmospheric pressure, until all of the polyol and DMPA reacted with isocyanate (target NCO). The following prepolymer formulation was the basis for the work described herein: 1.60 NCO/OH (with 2',4-TDI as the isocyanate), 1.25% COOH (with DMPA as the carboxylate) and 10% NMP (solvent).

After the reaction was completed (target NCO value reached), the reactor was cooled to about 30-40° C. and triethylamine (TEA) (17.25 g) was added to neutralize the prepolymer. Sufficient TEA was added to neutralize 95-100% of the carboxylate (DMPA). The prepolymer was mixed for 15-30 minutes to ensure completion of reaction with the TEA. The neutralized prepolymer was poured into a dispersion vessel containing water (see below).

Dispersion and Film Preparation

A dispersion vessel (an open, unheated, baffled, cylindrical steel tank) was precharged with sufficient deionized water to achieve the targeted percent solids (about 40%) and agitated (about 10 hp/1000 gal with a COWLES disperser). The neutralized prepolymer was added to the water (over 2-3 minutes). The dispersion was agitated for about 60 minutes before pouring into a storage container. During this step, a small layer of foam (0.25 in. to 1 in.) formed on the surface.

Dispersions may be evaluated by making a film or dipping gloves. As the process of making a film is fairly simple, it was used to evaluate the physical properties of the dispersions of the present invention. In this process, the dispersion was spread uniformly onto a flat surface (glass or MYLAR), allowed to dry overnight and heated at 120° C. for about 45 minutes, after which time the film was analyzed for IPA resistance and tensile properties. The standard evaluation was as follows:

The "Percent Isopropanol (IPA) Swell" is a test in which a one-inch diameter circle was stamped out from a section of film or glove, which is 0.005-0.007 in. thick. The sample was soaked in a beaker of 70% IPA/30% water at ambient temperature for a specified amount of time, such as 10 minutes. The diameter of the circle was measured as a function of time. If, for example, the diameter increased from 1 in. to 1.25 in., the percent swell was reported as 25%. Ideally, the swell should be negligible, although a value less than 50% is considered by those in the art to be reasonable. It is important that any sample evaluated for Percent IPA Swell be within the thickness range given above, because the Percent Swell is very sensitive to thickness. Thick samples tend to swell less, because the IPA does not have sufficient time to diffuse through the sample.

The "300% IPA Stretch Test" involved stretching a rectangular section of film (generally 0.005-0.007 in. thick) to four times the original length (300%), while briefly rubbing the surface of the film with a small towelette moistened with IPA/water. The film was maintained in the stretched position until it broke or until 2 minutes passed (whichever occurred first). If the film did not break within two minutes, the IPA resistance was considered good.

Tensile strength (psi) and elongation (%) data at break, and modulus at 100% (psi) were determined according to ASTM D412 using an INSTRON universal testing machine. Where appropriate, elongation was recorded using an elastomeric extensometer. In some cases, it was recorded using one-inch benchmarks and an elongation ruler or via jaw separation.

TABLE I

| Polyol used in prepolymer | UV Cure (min.) | 300% IPA Stretch (sec.) | 10-Min. IPA % Swell | Tensile Strength (psi) | Percent Elongation | 100% Modulus (psi) |
| --- | --- | --- | --- | --- | --- | --- |
| A | None | 20 | 100 | >1000 | 1100 | 130 |
| A | 20 | >120 | 50 | >1000 | 1100 | 86 |
| B | None | >120 | 50 | 1621 | 1050 | 143 |
| B | 3 | >120 | 50 | 1898 | 924 | 176 |
| B | 5 | >120 | 31 | 1624 | 881 | 139 |
| B | 6 | >120 | 31 | 1275 | 801 | 145 |

Prepolymers were made with trimethylolpropane triacrylate and 2,2-dimethoxy-1,2-diphenylethan-one (CIBA 651) as photoinitiators. Swell test conducted in 70% IPA/30% water. Film thickness is about 0.0074 inch.

Thin films prepared from a water dispersion of the prepolymers made with the inventive polyols showed a significant improvement in IPA resistance. The IPA resistance of the film was measured as the percent swell of the film, after being soaked in a 70/30 IPA/water solution at ambient temperature for 10 minutes. As can be appreciated by reference to Table I, the control, which was the film made without any UV cure, showed a 100% swell after IPA soak (Polyol A). After UV cure, the film swelled only 50% in the IPA soak. Again by reference to Table I, with Polyol B, the swell was also reduced after the UV cure. One of the advantages of the UV cure, as shown in Table I is the improvement of IPA resistance without any significant degradation in the physical properties of the film (tensile, elongation and modulus).

The inventors have made a series of 28-OH triols and diols with two to four percent by weight of cis-1,2,3,6-tetrahydrophthalic anhydride randomly distributed on the polyol backbone. These polyols were UV-curable through the unsaturation of the anhydride. The inventors have also found that the cross-linking reaction was enhanced when a small amount of cross-linking agent such as trimethylolpropane triacrylate was used in addition to the photoinitiator.

Synthesis of a Propylene Oxide/Maleic Anhydride Copolymer

A clean, dry one-liter polyol reactor was charged with a 425 MW polypropylene glycol (213 g; 0.5 moles, commercially available as PPG-425 from Bayer MaterialScience), maleic anhydride (148 g; 1.51 moles) and a DMC catalyst (0.2 g). The mixture was heated with stirring under vacuum (0.5 psia) with a nitrogen purge and held at 130° C. for 30 minutes to remove traces of water from the polyol. The vacuum valve was closed, thus blocking the reactor, and propylene oxide (50 g; 0.86 moles) was introduced into the reactor at a rate of 10 g/minute. At the end of the activation feed, the pressure in the reactor had increased to 22 psia. About 10 minutes after the activation feed was completed, the pressure had dropped to 10 pounds, indicating activation of the catalyst. Additional propylene oxide (390 g; 6.70 moles) was added over 3.5 hours while maintaining the reaction temperature at 130° C. After the feed, the mixture was allowed to stir an additional 30 minutes, followed by a vacuum strip for 30 minutes (both at 130° C.). The product was cooled to 60° C. and drained from the reactor to yield 776 g of a clear yellow liquid.

Analysis of the product gave a hydroxyl number of 70.9 mg KOH/g (theory=70.3) and a number average MW of 1261 g/mole with a polydispersity of 1.25 measured by gel permeation chromatography (GPC), There was no evidence for residual monomeric maleic anhydride in the polyol by GPC.

Examples 1-3

The propylene oxide/maleic anhydride polyol made using the above described procedure (100 parts) was mixed well with 32.8 parts of an isocyanate containing aliphatic urethane acrylate (commercially available as ROSKYDAL 2337 from Bayer MaterialScience), 9.3 parts of a photoinitiator (a 50/50 mixture of bis(2,4,6-trimethylbenzoyl)-phenylphosphineoxide and 2-hydroxy-2-methyl-1-phenyl-propan-1-one which is commercially available from Ciba Specialty Chemicals as DAROCUR 4265), 2.2 parts of a second photoinitiator (1-hydroxy-cyclohexyl-phenyl-ketone which is commercially available from Ciba Specialty Chemicals as IRGACURE 184), 1.2 parts of dibutyltin dilaurate (commercially available as DABCO T12 from Air Products), 3 parts of an organofunctional silicone oil (commercially available from Bayer AG as BAYSILONE OL44) and 100 parts of butyl acetate. This solvent-borne formulation was drawn down on steel panels, cured under the various conditions shown below in Table II and subjected to a MEK double rub test. The MEK double rub test is a standard test known in the art for determining solvent resistance. The test involves saturating a cloth with methyl ethyl ketone and rubbing the coated panels with one complete forward and backward motion over the coated surface.

TABLE II

| Ex. No. | Cure Conditions | MEK Double Rubs |
|---|---|---|
| 1 | Bake at 100° C. for 30 min. | 35 pass |
| 2 | UV-A exposure* for 4 min. at 10 in. | 100 pass - film softens |
| 3 | Bake + UV | 200 pass |

*using H&S Autoshot low intensity UVA400 lamp

As can be appreciated from reference to Table II, the UV curing of double bonds greatly improves the solvent resistance of the polyurethane coatings made with the inventive ultraviolet (UV)-curable polyol.

Examples 4 and 5

The propylene oxide/maleic anhydride polyol made using the above described procedure (100 parts) was mixed well with 18.8 parts of an isocyanate aliphatic trimer (commercially available from Bayer MaterialScience as DESMODUR N3600), 9.3 parts of photoinitiator (DAROCUR 4265), 2.2 parts of a second photoinitiator (IRGACURE 184), 1.2 parts dibutyltin dilaurate (DABCO T12), 3 parts of BAYSILONE OL44 and 100 parts of butyl acetate. This solvent-borne formulation was drawn down on steel panels, cured under the various conditions shown below in Table III and subjected to a MEK double rub test. The results are summarized below in Table III.

TABLE III

| Ex. No. | Cure Conditions | MEK Double Rubs |
|---|---|---|
| 4 | Bake at 100° C. for 30 min. | 37 pass |
| 5 | UV-A exposure* for 4 min. at 10 in. | 100 pass - film softens |

*using H&S Autoshot low intensity UVA400 lamp

As can be appreciated from reference to Table III, the UV curing of double bonds greatly improves the solvent resistance of the polyurethane coatings made with the inventive ultraviolet (UV)-curable polyol.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. An ultraviolet (UV)-curable polyol comprising a reaction product of:
   about 30 wt. % to about 70 wt. % of a hydroxy functional compound having a functionality of about 2 to about 3;
   about 1 wt. % to about 10 wt. % of an unsaturated carboxylic acid or anhydride; and
   about 20 wt. % to about 69 wt. % of an alkylene oxide, such that the sum of the percentages totals 100,
   wherein the reaction producing the ultraviolet (UV)-curable polyol occurs in the presence of a double metal cyanide (DMC) catalyst.

2. The ultraviolet (UV)-curable polyol according to claim 1, wherein the hydroxy functional compound comprises about 30 wt. % to about 60 wt. % of the polyol.

3. The ultraviolet (UV)-curable polyol according to claim 1, wherein the hydroxy functional compound is chosen from polypropylene oxide, polyethylene oxide, polybutylene oxide, copolymers of propylene oxide and ethylene oxide, copolymers of propylene oxide and butylene oxide, copolymers of butylene oxide and ethylene oxide, and mixtures thereof.

4. The ultraviolet (UV)-curable polyol according to claim 1, wherein the unsaturated carboxylic acid or anhydride comprises about 1 wt. % to about 5 wt. % of the polyol.

5. The ultraviolet (UV)-curable polyol according to claim 1, wherein the unsaturated carboxylic acid or anhydride is chosen from cis-1,2,3,6-tetrahydrophthalic acid, cis-1,2,3,6-tetrahydrophthalic anhydride, maleic acid, maleic anhydride and mixtures thereof.

6. The ultraviolet (UV)-curable polyol according to claim 1, wherein the alkylene oxide comprises about 20 wt. % to about 50 wt. % of the polyol.

7. The ultraviolet (UV)-curable polyol according to claim 1, wherein the alkylene oxide is chosen from propylene oxide, ethylene oxide, butylene oxide and mixtures thereof.

* * * * *